US 8,410,755 B2

(12) United States Patent  (10) Patent No.: US 8,410,755 B2
Chau  (45) Date of Patent: Apr. 2, 2013

(54) FAULT TOLERANT MODULAR BATTERY MANAGEMENT SYSTEM

(76) Inventor: Hak Hon Chau, Hong Kong (HK)

( * ) Notice: Subject to any disclaimer, the term of this patent is extended or adjusted under 35 U.S.C. 154(b) by 512 days.

(21) Appl. No.: 12/722,542

(22) Filed: Mar. 12, 2010

(65) Prior Publication Data

US 2010/0315043 A1  Dec. 16, 2010

Related U.S. Application Data

(60) Provisional application No. 61/187,273, filed on Jun. 15, 2009.

(51) Int. Cl.
*H02J 7/00* (2006.01)
(52) U.S. Cl. .......................... 320/118; 320/134
(58) Field of Classification Search .......... 320/116–119, 320/134

See application file for complete search history.

(56) References Cited

U.S. PATENT DOCUMENTS

| 5,751,150 A * | 5/1998 | Rippel et al. ............... 324/537 |
| 2006/0250929 A1* | 11/2006 | Ishikawa et al. ............ 369/100 |
| 2009/0039831 A1* | 2/2009 | Ichikawa ..................... 320/118 |

FOREIGN PATENT DOCUMENTS

| CN | 101409526 | 4/2009 |
| JP | 2007290845 A * | 10/2007 |

OTHER PUBLICATIONS

International Search Report and Written Opinion of counterpart patent application.
Hong Kong Short-term Patent Search Report.

* cited by examiner

*Primary Examiner* — Samuel Berhanu

(57) ABSTRACT

A modular battery management system for managing a plurality of batteries and driving a load includes a plurality of battery management control modules; a plurality of bi-directional voltage converter modules respectively connected to the batteries and connected to the battery management control modules, the bi-directional voltage converter modules being connected to each other in parallel; and a plurality of energy storage modules respectively connected with the bi-directional voltage converter modules in parallel and connected to the load. The bi-directional voltage converter modules are configured to transfer electric energy from the batteries to the load or from the energy storage modules to the batteries. The battery management control modules are configured to execute a predetermined program based on the state information of each battery and control the bi-directional voltage converter modules. The batteries, the bi-directional voltage converter modules, the energy storage modules, and the battery management control modules are arranged in a redundant topology so that if any one of the components fails, the other components resume the functions of the failing component.

6 Claims, 2 Drawing Sheets

FAULT TOLERANT MODULAR BATTERY MANAGEMENT SYSTEM

CROSS-REFERENCE TO RELATED APPLICATIONS

This application claims the benefit of U.S. provisional Patent Application No. 61/187,273, filed on Jun. 15, 2009; the contents of which is hereby incorporated by reference.

FIELD OF THE PATENT APPLICATION

The present application generally relates to battery management systems for electric vehicles or hybrid electric vehicles and more particularly to a fault tolerant modular battery management system (MBMS) capable of supporting critical loads with high power requirements.

BACKGROUND

The electrical power requirements for electric vehicles (EV) or hybrid electric vehicles (HEV) can be very high. The battery will undergo discharging and charging cycles during vehicle start up/running mode and running/braking/internal and external charging mode respectively. The management of battery state of health, battery state of charge and battery temperature is critical in electric vehicle or hybrid electric vehicle applications when electric power cannot be interrupted during driving. And, different battery types, voltage and power requirements in different electric vehicles or hybrid electric vehicles may require different battery management systems. Therefore, the battery power supply system framework may be totally different from one vehicle design to another vehicle design due to the differences in battery type, power requirement and vehicle operating voltage. Sometimes the charging and replacement time of the battery packs may create a temporary interruption to user. A failed battery pack may cause the electric vehicle or hybrid electric vehicle to malfunction instantly. Conventionally, the battery packs (or cells) are connected in series forming a Battery Pack Assembly (BPA) in order to provide high voltage and high current to the electric vehicle or hybrid electric vehicle motors and other auxiliary systems. Since the battery packs or cells are connected in series, the charging and discharging current will flow through each battery pack (or cell) simultaneously. This causes problems in balancing individual battery pack (or cell) characteristics. A conventional battery management system detects the individual battery pack's (cell's) state of charge, state of health and battery temperature through complicated battery management design because of the serial connections between batteries. Individual battery pack (or cell), depending on the detected battery pack (or cell) condition, will be switched to be connected with (ON) or disconnected from (OFF) the serial connected battery packs (or cells). As a result, the BPA output voltage fluctuates. This will cause instability problem to motor drivers and associated circuits. Therefore, a DC/DC converter will be employed to convert the fluctuating BPA output voltage to a stable voltage supply for motor drivers and associated circuits. However, the DC/DC converter must operate at high voltage and high current conditions. The high power dissipation in the DC/DC converter generally lowers the reliability of the overall system. The system will shut down whenever the DC/DC converter fails. Further, the battery pack assembly (BPA) power cannot be easily increased or decreased to match with different loading requirements. Furthermore, a dead battery pack or cell cannot be replaced until the battery pack assembly (BPA) is disassembled from the vehicle.

Accordingly, there is a need in the art for an improved battery management system with fault tolerant features to resolve the battery imbalance and dead cell problems. Further, additional features such as variation of power bus voltage, power output capacity and number of batteries are desired to be achieved.

The above description of the background is provided to aid in understanding a fault tolerant modular battery management system, but is not admitted to describe or constitute pertinent prior art to the fault tolerant modular battery management system disclosed in the present application.

SUMMARY

The present patent application is directed to a modular battery management system for managing a plurality of batteries and driving a load. In one aspect, the system includes a plurality of battery management control modules; a plurality of bi-directional voltage converter modules respectively connected to the batteries and connected to the battery management control modules, the bi-directional voltage converter modules being connected to each other in parallel; and a plurality of energy storage modules respectively connected with the bi-directional voltage converter modules in parallel and connected to the load. The bi-directional voltage converter modules are configured to transfer electric energy from the batteries to the load or from the energy storage modules to the batteries. The battery management control modules are configured to execute a predetermined program based on the state information of each battery and control the bi-directional voltage converter modules.

The energy storage modules may be capacitors, super capacitors, ultra capacitors, flywheels or any form of recyclable electric energy storage elements.

The bi-directional voltage converter modules may be configured to transfer electric energy from the energy storage modules to the batteries so as to charge the batteries when the voltage on the energy storage modules exceeds a predetermined value.

The bi-directional voltage converter modules may be respectively connected to the batteries through a first plurality of switches. The energy storage modules are respectively connected with the bi-directional voltage converter modules in parallel through a second plurality of switches. The load is connected to the energy storage modules through a third switch. The first plurality of switches, the second plurality of switches and the third switch are controlled by the battery management control modules.

The battery management control modules may be configured to disable one of the first plurality of switches and the bi-directional voltage converter module connected with the switch simultaneously.

The modular battery management system may further include a plurality of battery state monitoring modules respectively connected to the batteries, connected to the battery management control modules, and configured for monitoring the state of each battery and sending the state information of each battery to the battery management control modules. The battery state monitoring modules and the bi-directional voltage converter modules are connected to the battery management control modules through a control bus.

When one battery management control module stops working properly, the other battery management control modules may be configured to resume the functions of the battery management control module.

The battery management control modules may be configured to adjust the output voltage levels of the bi-directional voltage converter modules based on an instruction from a user.

DETAILED DESCRIPTION

Reference will now be made in detail to a preferred embodiment of the fault tolerant modular battery management system disclosed in the present patent application, examples of which are also provided in the following description. Exemplary embodiments of the fault tolerant modular battery management system disclosed in the present patent application are described in detail, although it will be apparent to those skilled in the relevant art that some features that are not particularly important to an understanding of the fault tolerant modular battery management system may not be shown for the sake of clarity.

Furthermore, it should be understood that the fault tolerant modular battery management system disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
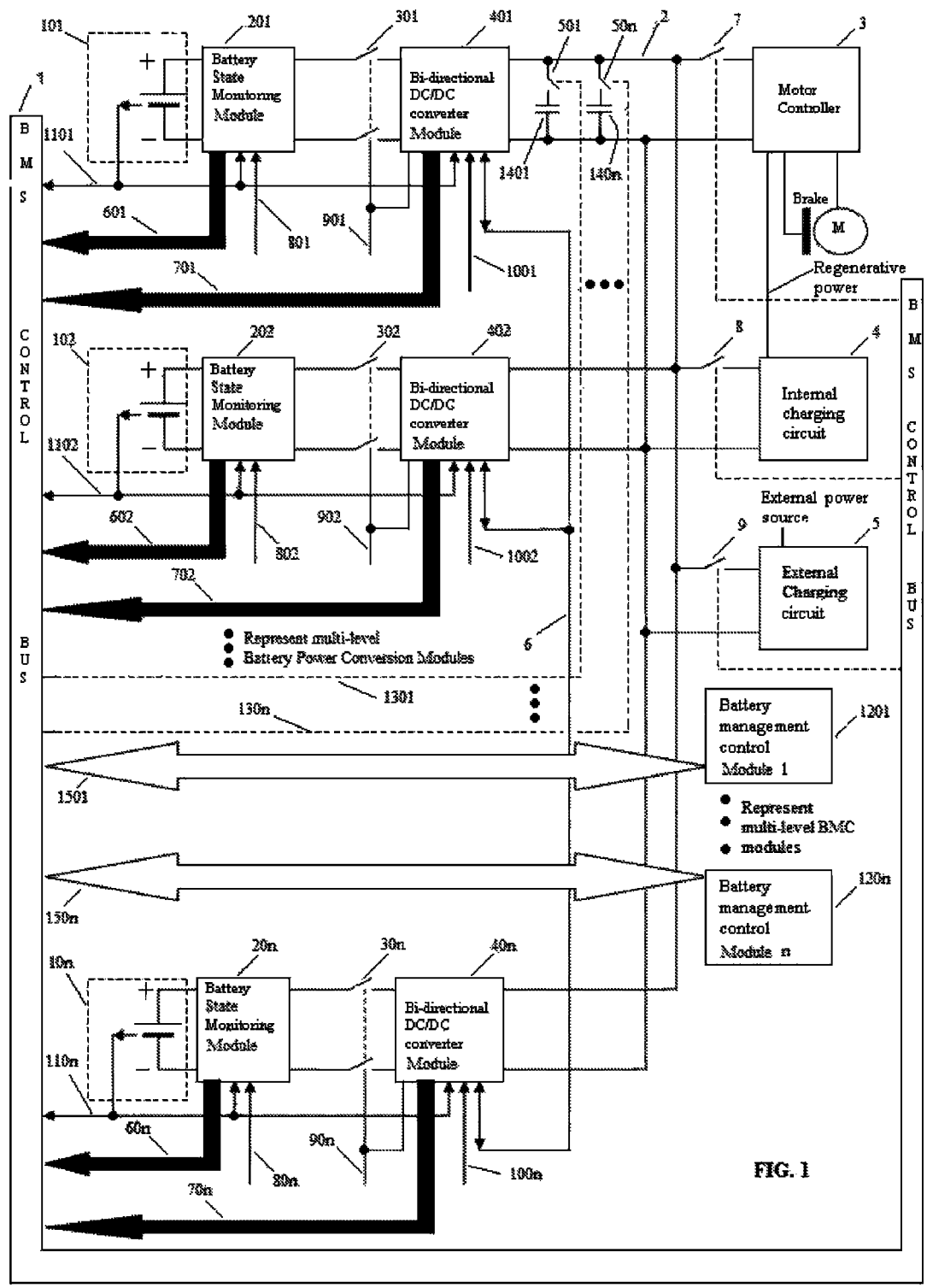
FIG. 1 is a schematic system block diagram of a fault tolerant modular battery management system according to an embodiment of the present patent application.
Figure 2:
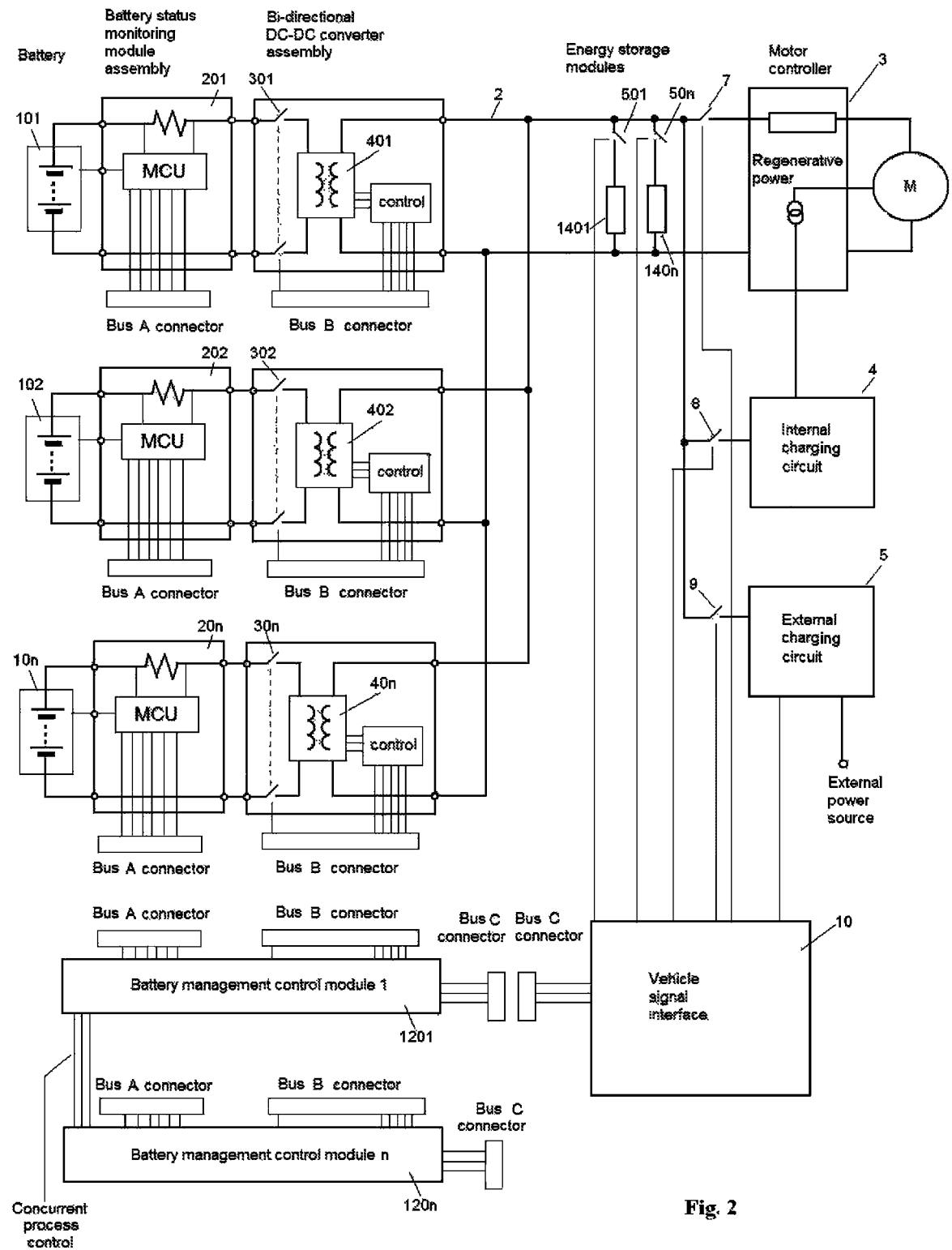
FIG. 2 is a schematic circuit diagram of the fault tolerant modular battery management system depicted in FIG. 1.

FIG. 1 is a schematic system block diagram of a fault tolerant modular battery management system according to an embodiment of the present patent application. FIG. 2 is a schematic circuit diagram of the fault tolerant modular battery management system depicted in FIG. 1. Referring to FIG. 1 and FIG. 2, the fault tolerant modular battery management system includes a plurality of battery state monitoring modules (201, 202, . . . , 20$n$), a plurality of bi-directional DC/DC converter modules (401, 402, . . . , 40$n$), a plurality of energy storage modules (1401, 1402, . . . , 140$n$), a plurality of battery management control modules (1201, . . . , 120$n$) and a plurality of battery packs (or cells) (101, 102, . . . , 10$n$). Each battery pack (or cell), such as 101, 102, . . . , 10$n$, is individually connected to a dedicated battery state monitoring module and then linked to a bi-directional DC/DC converter (such as 401, 402, . . . , 40$n$) through a plurality of switches 301, 302, . . . , 30$n$. This combination is called Battery Power Conversion Module (BPCM). Each battery pack (or cell) is isolated from other battery packs (or cells). This topology is different from serially connected batteries in conventional battery management systems. The bi-directional DC/DC converter outputs are connected in parallel so as to increase the overall output current capacity to provide loading current.

The battery packs may include all kinds of batteries, which may be but not limited to lead-acid batteries, Nickel-metal hydride batteries, Nickel-Cadmium batteries, Lithium-Ion batteries, Lithium-Polymer batteries, Zebra Na/NiCl$_2$ batteries, NiZn batteries, Lithium iron phosphate batteries, Ferrous batteries, or any forms of electrical rechargeable energy storage elements.

As used herein, the energy storage (ES) modules refer to electric energy storage elements, which may be but not limited to capacitors, super capacitors, ultra capacitors, flywheels, or any form of recyclable electric energy storage elements. In this embodiment, referring to FIG. 1, the energy storage modules are the capacitors 1401, . . . , 140$n$, which are connected to all the bi-directional DC/DC converter modules through the switches 501, . . . , 50$n$ respectively.

As used herein, the bi-directional DC/DC converter modules refer to electrical constructions that can act to charge energy from Energy Storage (ES) module to battery packs (or cells) or convert energy from battery packs (or cells) to Energy Storage (ES) modules and a load connected with the energy storage modules.

The connections between the bi-directional DC/DC converter outputs, energy storage modules and the load are called the power buses. Electric current may be drawn from the power bus to the load. The loading current will be shared among bi-directional DC/DC converter outputs. The bi-directional DC/DC converter modules can be of an isolated type or a non-isolated type, and are configured to convert battery voltages to required loading voltage levels. Therefore, the loading voltage is determined by the bi-directional DC/DC converter output voltage settings instead of the serially connected batteries' end terminal voltages in conventional battery management systems. On the other hand, the bi-directional DC/DC converter modules can charge the batteries when sufficient energy is stored in the energy storage modules. This can resolve the battery pack (or cell) imbalance problem in conventional battery management systems.

The battery state monitoring (BSM) modules (201, 202, . . . , 20$n$) are configured to provide battery state information to the bi-directional DC/DC converter modules and Battery Management Control (BMC) Modules (1201, . . . , 120$n$). The BMC modules are configured to send control instructions to each Battery Power Conversion Module (BPCM) per individual operating state. For example, battery energy may be transferred from the batteries to the power bus through the bi-directional DC/DC converter modules, the batteries may receive energy from the power bus to charge the batteries through the bi-directional DC/DC converter modules, battery packs may be disabled and disconnected from the system, batteries may be removed from the system and additional Battery Power Conversion Modules (BPCMs) may be added to the system. Simultaneously, some battery packs (or cells) may undergo discharge cycles (delivering power), some other batteries may undergo charging cycles (receiving power) and yet some other batteries may be disconnected from the system, depending on the algorithm executed in the BMC program.

The battery packs (cells) may be disconnected either under a fully charged, an unsafe or a dead condition. If one of the batteries is required to be removed from the system, the battery state monitoring (BSM) module will activate a release signal on the BSM module panel and to the BMC module. The fully charged battery packs (cells) will be connected back to the BPCM under the control of BMC module. The unsafe battery packs (or cells) are connected back to BPCM under the control of BMC module if the unsafe condition is removed.

A user can remove a battery from the modular battery management system. Likewise, the user can install a replacement battery to the modular battery management system and then activate the battery state monitoring module to inform the Battery Management Control (BMC) modules through the Battery Management System (BMS) Control Bus. If a new battery is installed to the system, additional BSMs and Bi-directional DC/DC converter are required. The new or replacement battery will become a part of the Modular Battery Management System (MBMS). With this technology, the user can increase the Modular Battery Management System (MBMS) output power by adding more Battery Power Conversion Modules (BPCMs) without major system design change, or remove battery packs (cells) from the system if required.

The power density of the batteries (or cells) may increase the MBMS output power as well. The energy storage modules are connected in parallel to the power bus. The energy storage modules are energy storage devices that can be charged up with high energy within a short period of time (for example, 10 to 20 minutes). The energy storage modules serve as buffers for surge loading current and in-rush charging current. When the voltage on energy storage modules exceeds a preset value, the Battery Management Control (BMC) modules will instruct the bi-directional DC/DC converter modules to charge up the battery packs (or cells) through the BMS control bus. During charging, the ES modules can be programmed to charge the battery packs individually or all at once or randomly.

The Battery Management Control (BMC) Modules are programmable units that can be programmed to perform different algorithms to meet different vehicle/car requirements, for example, different voltage levels, different battery packs (or cells) characteristics, and different loading current requirements. Individual BMC module is configured to monitor the BMS control bus. Once a BMC module is in fault condition, the other BMC modules will take over the control without shutting down the system.

In addition to fault redundant features, the Battery Management Control module can adjust the output voltage level of the bi-directional DC/DC converter modules within certain range in order to increase the torque of the motor (DC or AC) while additional torque is required for hill climbing. Thus, it can serve as an Electric Torque Control (ETC).

Referring to FIG. 1 and FIG. 2, the modular battery management system is based on a redundant topology. Therefore, the detailed description on the first stage of Battery Power Conversion Module (BPCM) is explained here and it can be expanded to cover the system up to n stages where n is a positive integer.

The first Battery Power Conversion Module (BPCM) stage structure includes a battery 101, which has positive (+) terminal, a negative (−) terminal and a battery temperature signal 1101. The battery 101 is connected to a BSM module 201. The BSM 201 is an electrical circuit that monitors the battery conditions, for example the state of charge, the state of health, the battery temperature, and the charging condition/status, and feedbacks the information to a Battery Management System (BMS) control bus 1 through a signal path 601. The control signal 801, from the BSM control bus 1, will be used to display the battery operating status via status indication devices such as LEDs, a display panel or lamps, which may be charging, discharging, dead battery, being connected to the bi-directional DC/DC converter or disconnected from the bi-directional DC/DC converter). The output voltage of the battery 101 is connected to the switch 301. The switch 301 is an electrical activated switch, which is used to control the electrical connection between the BSM module 201 to the bi-directional DC/DC converter 401. The switch 301 is electrically controlled by a control signal 901, which is transmitted from the Battery Management Control (BMC) modules 1201, . . . , 120n. The switch 301 can be manually disabled during maintenance or servicing. This is to avoid electrical hazard during maintenance or servicing. In addition, the signal 901 controls the ON or OFF status of the bi-directional DC/DC converter 401. If the switch 301 is disabled by the signal 901 or by manual switching, the bi-directional DC/DC converter 401 will be disabled simultaneously. The bi-directional DC/DC converter 401 can be disabled by the control signal 1001 during maintenance or servicing.

The battery 101's temperature signal 1101 is also connected to the bi-directional DC/DC converter 401. The bi-directional DC/DC converter module 401 will adjust the charging or discharging current in according to the signal 1101. The current distribution between different levels of bi-directional DC/DC converter modules is controlled through the current sharing signal bus 6, which can be analog or digital signal bus. The current sharing signal bus 6 is bi-directional. The bi-directional DC/DC converter module 401 has a current sharing signal output which is bi-directional and connected to the current sharing signal bus 6. Other bi-directional DC/DC converter modules' current sharing signal outputs are connected to the current sharing signal bus 6. The bi-directional DC/DC converter module 401 will adjust its output current according to the current sharing signal bus 6's voltage level or digital signal. The voltage level or digital information of the current sharing signal bus 6 represents the average load current for each bi-directional DC/DC converter module. The bi-directional DC/DC converter 401 will communicate with the BSM control bus through the bi-directional bus 701. The outputs of the bi-directional DC/DC converter modules are connected to a power bus 2. The power bus 2 connects the Energy Storage modules 1401 up to 140n, motor controller 3 (which can be single or multiple), an internal charging circuit 4 and an external charging circuit 5. The Energy Storage modules 1401 to 140n are connected to the power bus 2 through the switch 501 to 50n respectively. The switches 501 to 50n are electrically controlled by BMC module through control signals 1301 to 130n respectively. The number of energy storage module activations is controlled by a program embedded in BMC. The energy storage modules 1401 to 140n are configured to provide energy buffers during charging and discharging. In the charging mode, it will store energy from the external charging circuit, the regenerative braking power, and the internal electricity generator(s). This energy will be used to charge back batteries 101 to 10n through the bi-directional DC/DC converter modules 401 to 40n respectively. In the discharge mode, it will provide power and energy to the motor controller as well as the surge load conditions so that the bi-directional DC/DC converter modules 401 to 40n will not be overloaded. The Battery Management Control (BMC) modules 1201 to 120n are connected and programmed in a redundancy topology.

If any of the BMC modules failed, the other BMC modules will seamlessly resume the functions of the failing module. The BMC modules are connected to the BMS Control Bus 1 through the bi-directional communication buses 1501 to 150n.

The switches 301 to 30n, 7, 8, and 9 are controlled by the battery management control modules 1201 to 120n through the BMS control bus. When the vehicle is parked, the switches 301 to 30n, 7, 8, and 9 are turned OFF. When the vehicle starts up before the running condition, the switches 7 and 8 will be turned ON. The switch 8 will be turned OFF if battery (or cell) charging is not required. While external charging is required, the switch 9 will be turned ON and the switches 7 and 8 will be turned OFF. This is to prevent electrical over-stress to the motor controller 3 and the internal electricity generator(s) 4 during external charging. If the motor controller or electricity generator(s) are designed to be able to withstand the stress, the switches 7 and 8 can be turned ON.

Referring to FIG. 2, in this circuit implementation, the battery status monitoring module assemblies (201, 201, . . . 20n) form an integral part of the system. The Bus A connector is connected to the BMS control bus. The connect/disconnect switch and the bi-directional DC/DC converter module forms the bi-directional DC/DC converter assembly which is an integral part of the systems. The Bus B connector is connected to the BMS control bus. The battery status monitoring module assemblies and bi-directional DC/DC converter assemblies are connected to the BMS control bus. The outputs of the bi-directional DC/DC converter assemblies are connected to the DC power bus (2) in parallel with each other. Likewise, the Battery management control modules are connected to the BMS control bus through the respective Bus A and Bus B connectors. The Bus C connector provides an interface between the vehicle signal interface 10 to the battery management control modules (1201, . . . , 120n) through the BMS control bus. The vehicle signal interface 10 is a control interface to Energy storage modules, internal charging circuits and external charging circuits.

In the aforementioned embodiments, the fault tolerant modular battery management system features multiple redundancy at all module levels. These redundancy features allow concurrent maintenance operations and provide multi-level fault tolerance. Therefore, the modular battery management system has improved reliability and availability. In addition, due to the modular design framework, the modules at all levels can be manufactured economically.

In the aforementioned embodiments, individual element or module can be removed from or added to the MBMS without interruption to the system availability. The battery pack (or cell) can be removed from or added to the MBMS without interruption to the system availability. The BSM module can be removed from or added to the MBMS without interruption to the system availability. The bi-directional DC/DC converter module can be removed from or added to the MBMS without interruption to the system availability. The Energy Storage module can be removed from or added to the MBMS without interruption to the system availability. The BMC module can be removed from or added to the MBMS without interruption to the system availability.

In the aforementioned embodiments, the MBMS provides a framework for EV or HEV or battery operated machines/equipments. This framework can be used for different battery types, power bus voltages, and output power requirements. The BSM and bi-directional DC/DC converter module can be combined as a single module (or unit) in a specific application. The battery packs (or cells) are operated individually instead of serial connected in conventional systems. The fault tolerant modular battery management system resolves the battery pack (or cell) imbalance problem that exists in conventional battery packs connected in series. The output voltage to the power bus is determined by the bi-directional DC/DC converter modules instead of the number of the battery packs (or cells) connected in series. When some of the battery packs (or cells) cannot provide an output power, the remaining battery packs (or cells) can provide a limited output power at a rated voltage to operate the motor driving circuits. The output current is provided by the sum of individual bi-directional DC/DC converter output currents.

In the aforementioned embodiments, during charging mode, the energy is charged directly to Energy Storage (ES) module(s). This can speed up the charging cycle. The stored energy in Energy Storage (ES) module(s) then charges up the battery packs (or cells) through the bi-directional DC/DC converter modules. The battery packs (or cells) in the MBMS can operate in different modes of operation simultaneously. This includes battery discharging, battery charging, battery being connected to the MBMS and battery being disconnected from the MBMS. The individual battery packs (or cells) can be programmed in discharging or charging mode by the BMC module. During vehicle driving mode, the energy fed by internal electricity generator(s), regenerative braking and other power generation devices can charge up some or all battery packs (or cells) through the Energy Storage (ES) module(s) and bi-directional DC/DC converter module(s). This extends the range of vehicle traveling distance. The battery life span can be extended. MBMS output capacity can be increased by the addition of battery Power Conversion Modules (BPCM). The MBMS output capacity can be reduced by removal of battery packs (or cells), or Battery Power Conversion Modules (BPCMs). The MBMS output voltage can be adjusted by the adjustment of bi-directional DC/DC converters output voltage. The control algorithm embedded in the BMC module can be programmed for individual battery pack charging, discharging and being disconnected from the MBMS. The control algorithm inside the BMC module can be programmed for different battery characteristics, e.g., nickel-metal hydride NiHM, lithium-ion Li ion, lithium-ion Polymer and etc. The BMC module can be interfaced with a driver through a BMC display panel. Battery charging and discharging status, remaining energy level, and alert for battery maintenance information can be provided by the BMC display panel.

In the aforementioned embodiments, the batteries can be a combination of different types. For example, Lead-acid and Lithium batteries can operate in the system simultaneously. The characteristic of high power density of lithium battery and deep cycle discharge of Lead-acid battery can contribute to a longer drive range.

While the present patent application has been shown and described with particular references to a number of embodiments thereof, it should be noted that various other changes or modifications may be made without departing from the scope of the present invention.

What is claimed is:

1. A modular battery management system for managing a plurality of batteries and driving a load, the system comprising: a plurality of battery management control modules; a plurality of battery state monitoring modules respectively connected to the batteries, connected to the battery management control modules, and configured for monitoring the state of each battery and sending the state information of each battery to the battery management control modules; a plurality of bi-directional voltage converter modules respectively connected to the batteries through a first plurality of switches and connected to the battery management control modules, the bi-directional voltage converter modules being connected to each other in parallel; and a plurality of energy storage modules respectively connected with the bi-directional voltage converter modules in parallel through a second plurality of switches and connected to the load through a third switch; wherein: the bi-directional voltage converter modules are configured to transfer electric energy from the batteries to the load or from the energy storage modules to the batteries; the battery management control modules are configured to execute a predetermined program based on the state information of each battery and control the bi-directional voltage converter modules, the first plurality of switches, the second plurality of switches and the third switch; and the battery state monitoring modules and the bi-directional voltage converter modules are connected to the battery management control modules through a control bus.

2. The modular battery management system of claim 1, wherein the bi-directional voltage converter modules are configured to transfer electric energy from the energy storage modules to the batteries so as to charge the batteries when the voltage on the energy storage modules exceeds a predetermined value.

3. The modular battery management system of claim 1, wherein the battery management control modules are configured to disable one of the first plurality of switches and the bi-directional voltage converter module connected with the switch simultaneously.

4. The modular battery management system of claim 1, wherein the battery management control modules are configured to adjust the output voltage levels of the bi-directional voltage converter modules based on an instruction from a user.

5. The modular battery management system of claim 1, wherein the energy storage modules are capacitors, super capacitors, ultra capacitors, flywheels, or any form of recyclable electric energy storage elements.

6. The modular battery management system of claim 1, wherein when one battery management control module stops working properly, the other battery management control modules are configured to resume the functions of the battery management control module.

* * * * *